US006158728A

United States Patent [19]

Smith

[11] Patent Number: 6,158,728

[45] Date of Patent: Dec. 12, 2000

[54] WORKPIECE HOLDING DEVICE

[76] Inventor: Gregory C. Smith, 7108 Beechwood Dr., Urbandale, Iowa 50322

[21] Appl. No.: 09/452,426

[22] Filed: Dec. 1, 1999

[51] Int. Cl.[7] ........................ B23Q 3/02

[52] U.S. Cl. ........................ 269/99; 269/93; 269/94; 269/88

[58] Field of Search ........................ 269/91–101, 231, 269/235, 88

[56] References Cited

U.S. PATENT DOCUMENTS

| | | | |
|---|---|---|---|
| D. 360,980 | 8/1995 | Noniewicz . | |
| 1,033,758 | 7/1912 | Howell | 269/99 |
| 2,372,716 | 4/1945 | Evans . | |
| 2,932,995 | 4/1960 | Durfee . | |
| 3,610,612 | 10/1971 | Day . | |
| 4,304,399 | 12/1981 | Szugda | 269/88 |
| 4,355,793 | 10/1982 | Juneau . | |
| 4,445,678 | 5/1984 | George . | |
| 4,641,821 | 2/1987 | Jaworski . | |
| 4,861,011 | 8/1989 | Varga . | |
| 4,927,126 | 5/1990 | Hoffman . | |
| 5,056,766 | 10/1991 | Engibarov . | |
| 5,244,193 | 9/1993 | Hehr . | |
| 5,247,846 | 9/1993 | Grossmann et al. | 269/91 |
| 5,358,228 | 10/1994 | Beere . | |
| 5,501,437 | 3/1996 | Kissilig . | |
| 5,695,178 | 12/1997 | Lenzkes | 269/94 |

OTHER PUBLICATIONS

EROWA K–System 5000 . . . EROWA Technology, Inc, Aug, 1996, Arlington Heights, IL, USA, pp. 4, 5, 24

Jergens Workholding Components, prior to Dec. 1, 1998, USA, p. 148.

Carr Lane Manuf. Co., Aug. 1998, St Louis, MO, USA, p. 38MF, 41MF.

Leveling Clamp, Clamping Components, prior to Dec. 1, 1998, USA, p. 1065.

*Primary Examiner*—David A. Scherbel

*Assistant Examiner*—Lee Wilson

*Attorney, Agent, or Firm*—Zarley, McKee, Thomte, Voorhees & Sease

[57] ABSTRACT

A workpiece holding device for a T-slotted machine table includes a locator block having a planar bottom surface, a mounting hole that intersects the bottom surface to define a center point, at least one workpiece locating surface disposed a predetermined distance from the center point, and a key protruding from the bottom surface at a second point offset a predetermined distance from the center point. The protruding portion of the key has a width substantially the same as the T-slot opening so as to slidably mount in the T-slot. A fastener extends through the mounting hole and secures the locator block to a T-nut slidably mounted in the T-slot. A clamp secured to the locator block clamps the workpiece to the locating surface of the locator block. A method of using the device is also disclosed.

18 Claims, 5 Drawing Sheets

WORKPIECE HOLDING DEVICE

BACKGROUND OF THE INVENTION

The present invention relates to the field of workpiece holding and locating devices for precision machining operations. More particularly, this invention relates to a device for precisely and adjustably securing a workpiece to a machining table having T-slots.

In order to machine a workpiece on a modern numerically controlled machine tool, it is necessary to precisely locate a reference feature of the workpiece, such as a side edge, or diameter, etc. relative to a known or "home" position on the machine tool once the workpiece has been mounted on the machine. Then other features can be machined into the workpiece in predetermined relation to the referenced feature. Before mounting the workpiece on the machine, it is conventional to mount cubical bases or fixture plates to the T-slots of the machine table using bolts and T-nuts. The T-nuts slidably mount in the T-slots of the table. Once the setup person or operator places the base or fixture plate on the machine, it is carefully positioned using conventional techniques and dial indicators before it is secured to the table. The bases or fixture plates then receive other fixture components, such as clamps and jigs to hold the workpiece in position. Sometimes the other clamping components must also be carefully positioned and checked with dial indicators to make sure they are in the proper position.

Two methods of mounting the clamps, etc. to the bases or fixture plates are typically utilized. In both methods, the base or fixture plate has an exposed upper or outer surface (different from the surface mounted to machine table). In the first method, a set of parallel T-slots are formed in the exposed surface and the clamps and jig mount with bolts and T-nuts to the exposed surface. In the second method, an exposed surface of the bases or fixture plates includes a very precise predetermined pattern of equally spaced threaded holes for positioning clamps, fixtures, or jigs to hold the workpiece in place.

Because of the tolerance stackup involved in these conventional multiple-component workpiece holding devices, the features of the bases or fixture plates must be machined to stringent tolerance requirements. Thus, bases and fixture plates are costly components in conventional workpiece holding systems. Furthermore, these conventional multiple-component workpiece holding devices and methods require considerable setup time and effort.

Therefore, a primary objective of the present invention is the provision of an improved workpiece locating and holding device.

Another objective of this invention is the provision of a workpiece holding device that mounts directly to the machine table and thereby eliminates the need for a separate base or fixture plate.

Another objective of this invention is the provision of a workpiece holding device that spaces the workpiece a known distance away from the table surface so as to provide a known clearance for cutting tools between the table and the workpiece.

Another objective of this invention is the provision of a workpiece holding device and method that reduces the time and effort required for setup.

Another objective of this invention is the provision of a workpiece holding device that is readily adaptable to a variety of different machine tables having different sizes of T-slots.

Another objective of this invention is the provision of a workpiece holding device that accurate and reliable in use because it is less sensitive to tolerance stackup and dimensional variation of its components.

Another objective of this invention is the provision of a workpiece holding device that is economical to produce and easy to use.

These and other objectives will be apparent from the drawings, as well as from the description and claims that follow.

SUMMARY OF THE INVENTION

The present invention relates to a device and method for precisely and adjustably securing a workpiece to a machining table having T-slots.

A workpiece holding device for a T-slotted machine table includes a locator block having a planar bottom surface, a mounting hole that intersects the bottom surface to define a center point, at least one workpiece locating surface disposed a predetermined distance from the center point, and a key protruding from the bottom surface at a second point offset a predetermined distance from the center point. The protruding portion of the key has a width substantially the same as the T-slot opening so as to slidably mount in the T-slot. A fastener extends through the mounting hole and secures the locator block to a T-nut slidably mounted in the T-slot. A clamp secured to the locator block clamps the workpiece to the locating surface of the locator block.

The method of using the device includes mounting a slidable T-nut in the T-slot; providing a locator block having a mounting hole therethrough, a planar bottom surface, a key offset from and in a predetermined location relative to the mounting hole, and at least one workpiece locating surface formed remote from the bottom surface and in a predetermined location with respect to the mounting hole and the key; placing the planar bottom surface of the locator block directly on the machine table with the key in the T-slot and -he mounting hole registered with the T-nut; loosely connecting the locator block to the T-nut by extending a fastener through the mounting hole until it engages the T-nut; moving the locator block so that the workpiece locating surface is in the desired location; tightening the fastener into the T-nut until the locator block is rigidly mounted to the table with the workpiece locating surface in the desired location; placing the workpiece in direct abutment with the workpiece locating surface; and clamping the workpiece securely to the locator block.

DETAILED DESCRIPTION OF THE PREFERRED EMBODIMENT(S)

Figure 1:
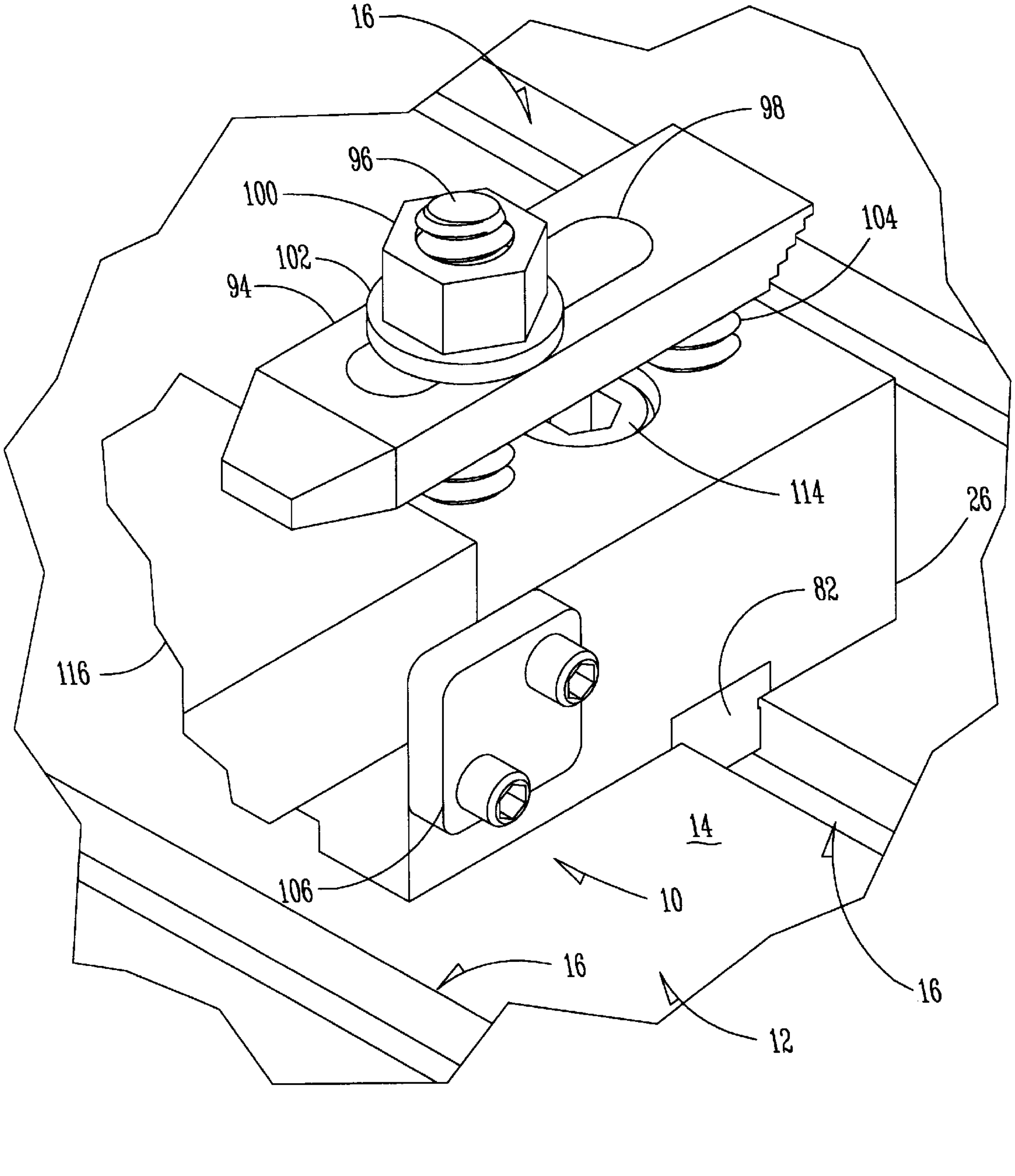
FIG. 1 is a perspective view of the workpiece holding device of the present invention mounted on a slotted machine table.

The workpiece holding device of this invention is designated by the reference numeral 10 in the figures. As seen in FIG. 1, the device 10 removably and adjustably mounts directly on the table 12 of a machine tool. The table 12 itself is conventional and has a flat surface 14 with a plurality of parallel elongated slots 16 formed therein. The slots 16 are called T-slots because they are shaped like an inverted T. The first leg or throat 18 of the T-slot 16 is perpendicular the table surface 14, while the second leg 20 extends parallel to the surface 14. A T-nut 22 that has a centrally located threaded hole 24 slidably mounts in the T-slot 16.

The workpiece holding device 10 includes a locator block 26 that has top and bottom surfaces 28, 30, opposite sides 32, 34 and opposite ends 36, 38. In FIGS. 1–6, the locator block 26 is a rigid rectangular prism formed of hardened steel, preferably American National Standards Institute (ANSI) 1045 hardened to approximately 50 $R_C$. Other shapes will not detract from the invention if the features and relationships described below are maintained.

A clearance hole 40 extends through the block 26 from the top surface 28 to the bottom surface 30. A counterbore 42 surrounds the top of the clearance hole 40. The hole 40 has a central axis 44 that intersects the bottom surface 30 at a first point 46.

The bottom surface 30 of the locator block 26 is planar or flat so as to precisely slidingly and matingly rest on the flat upper surface 14 of the machine tool table 12. Two intersecting perpendicular elongated keyways 48, 50 are formed in the bottom surface 30 and extend longitudinally and transversely respectively. The keyway 48 has a rectangular cross-section and a central longitudinal axis 52 that extends through the point 46 of the hole 40. Likewise, keyway 50 has a rectangular cross-section and a central longitudinal axis 54 that extends through point 46.

Four identically threaded holes 56, 58, 60, 62 open into the keyways 48, 50 formed in the bottom surface 30 as shown in FIGS. 3–6. Holes 56 and 58 are offset in opposite directions from the point 46 along the axis 52. Holes 60 and 62 are of-set in opposite directions from the point 46 along axis 54. Threaded holes 64, 66 extend into the locator block 26 from the top surface 28. Threaded holes 68, 70 and 72, 74 extend into sides 32, 34 respectively of the locator 26 as shown.

Figure 2:
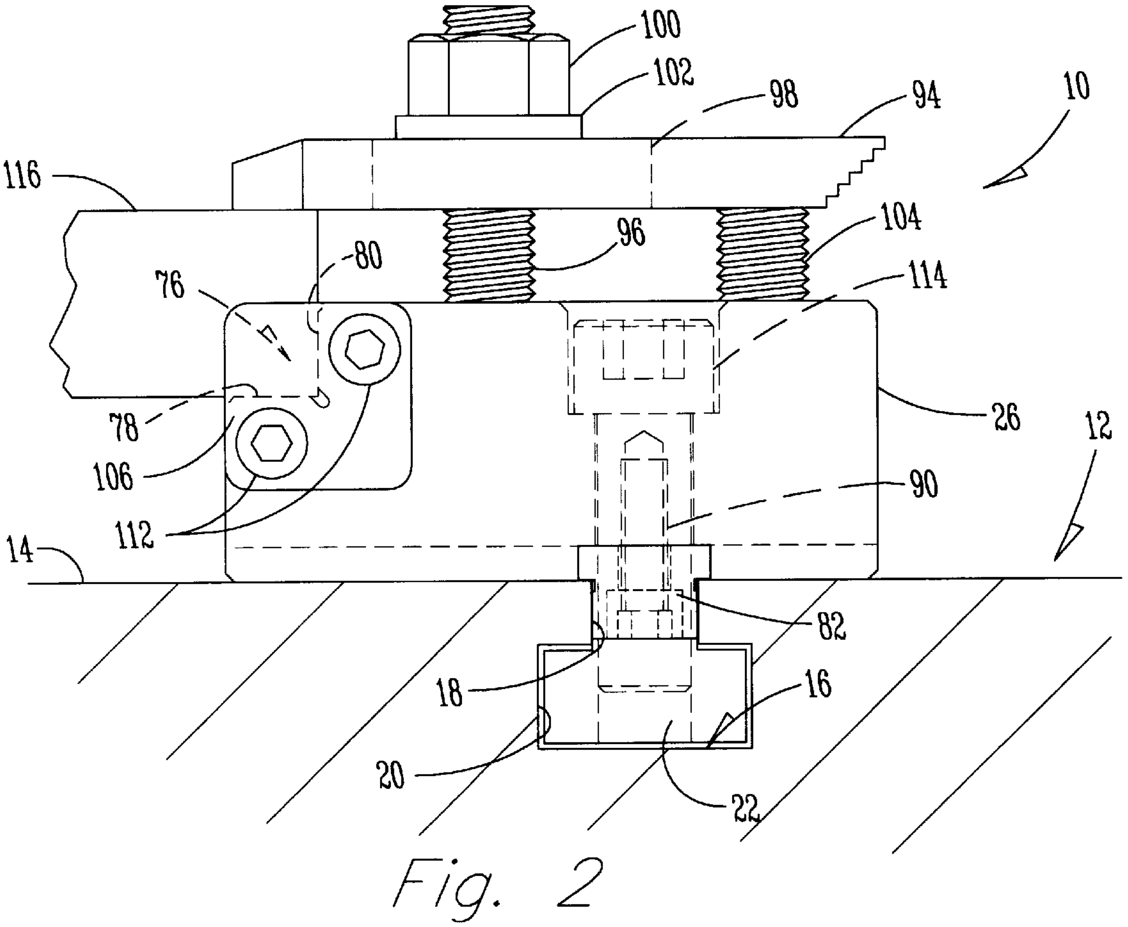
FIG. 2 is a front elevation view of the workpiece holding device of FIG. 1 with the table shown in cross-section.
Figure 3:
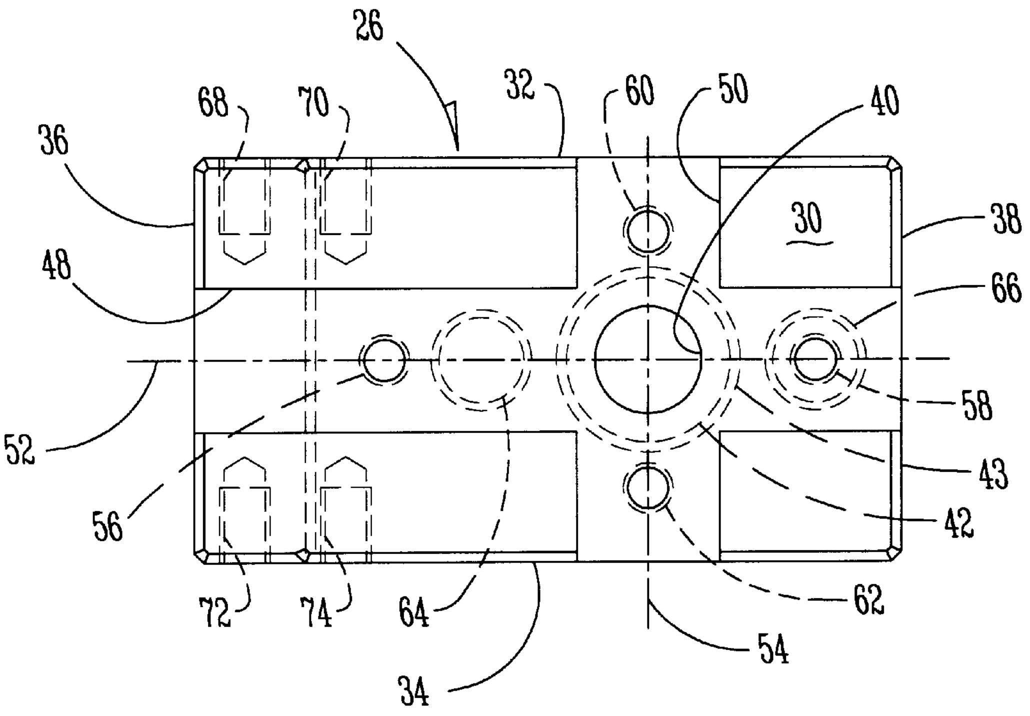
FIG. 3 is a plan view of the bottom of the locator block of this invention.
Figure 4:
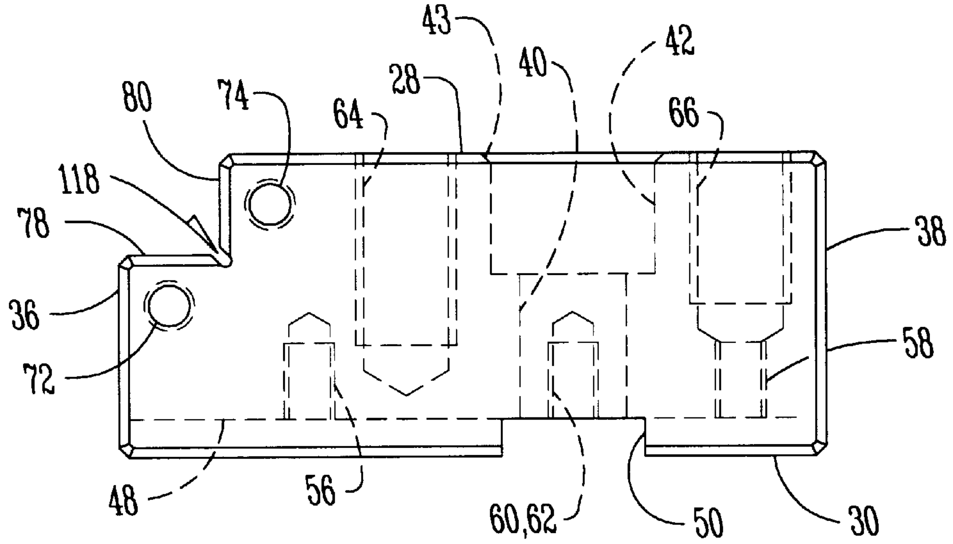
FIG. 4 is a front elevation view of the locator block of FIG. 3.
Figure 5:
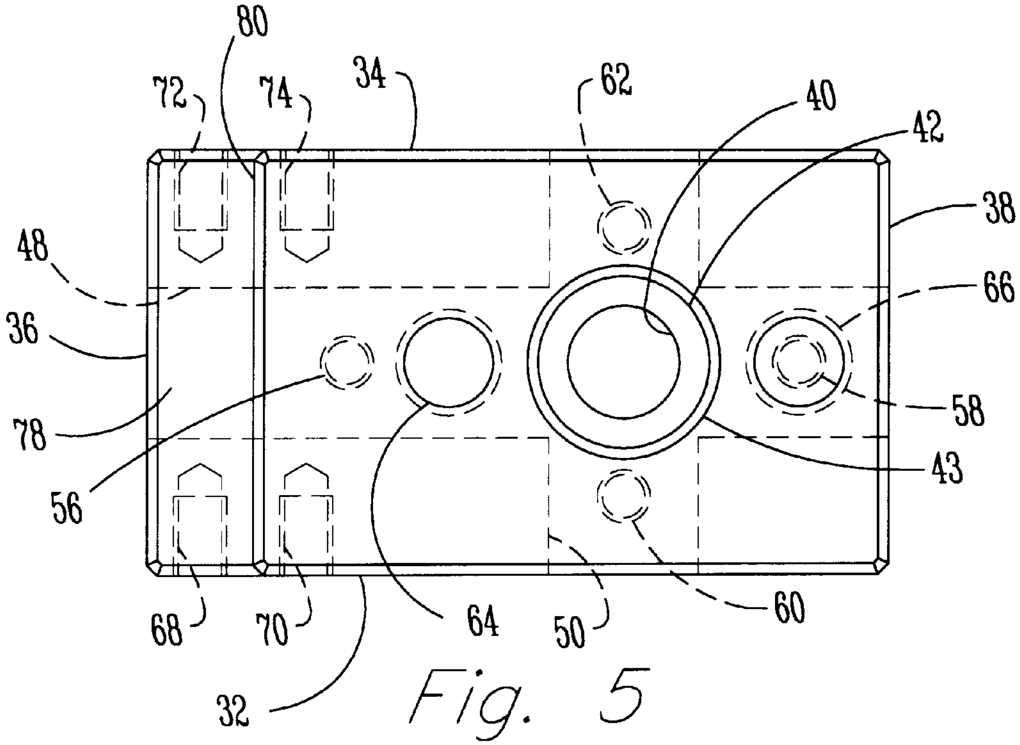
FIG. 5 is a top plan view of the locator block of FIG. 3.
Figure 6:
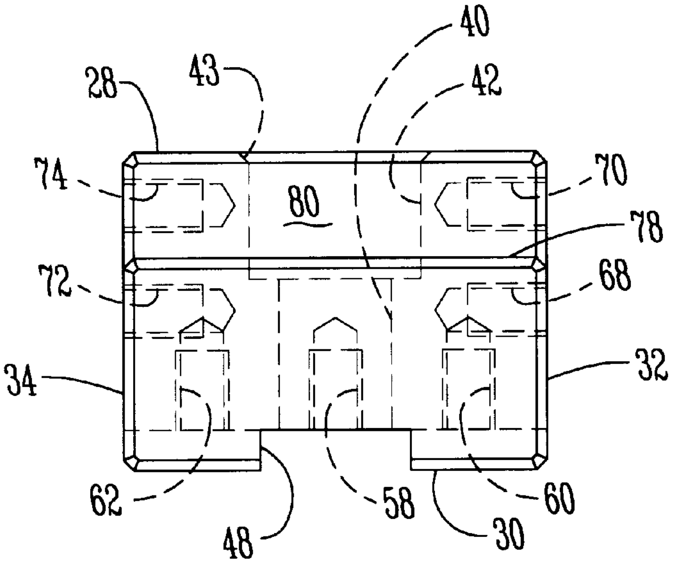
FIG. 6 is a left end elevation view of the locator block of FIG. 3.

As best seen in FIGS. 2 and 4, the top surface 28 at the end 36 has an elongated notch 76 formed therein. The notch 76 extends from side 32 to side 34. The notch 76 is L-shaped, having a first planar (flat) surface 78 extending parallel to the bottom surface 30 and a second planar surface 80 extending perpendicular to the surface 30 and the longitudinal axis 52 of the keyway 48. In other words, the surface 80 is parallel to the axis 54 of the keyway 50. The notch surface 78 is elevated a predetermined distance (such as, for example, 1.000 inch or 25.40 millimeters) above the bottom surface 30 of the locator block 26. The other notch surface 80 is located a predetermined distance from the axis 54 of the keyway 50 and thereby the mounting hole 40 and holes 60, 62.

Figure 7:
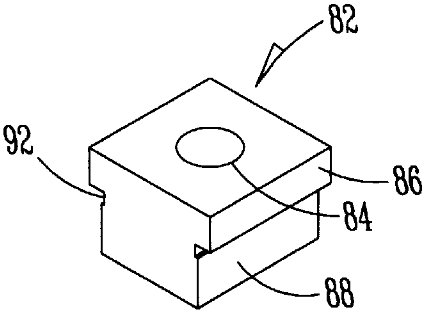
FIG. 7 is a perspective view of the key from FIGS. 1 and 2.
Figure 8:
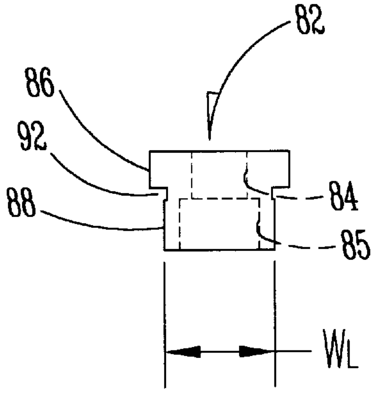
FIG. 8 is a front elevation view of the key of FIG. 7.
Figure 10:
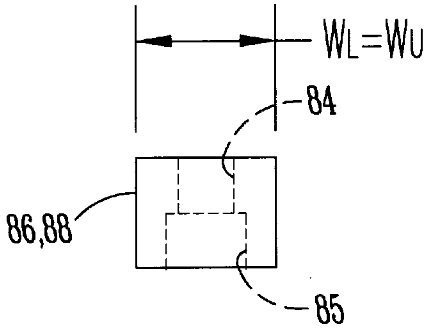
FIG. 10 is a front elevation view of a special case of the key of FIG. 7 where the widths of the upper and lower portions are the same.
Figure 9:
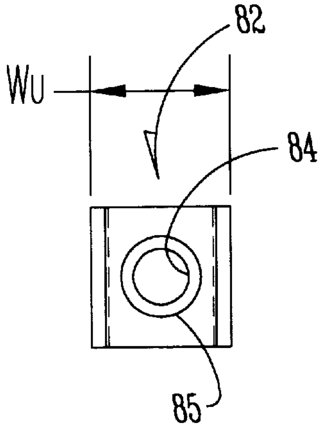
FIG. 9 is a bottom view of the key of FIG. 7.
Figure 11:
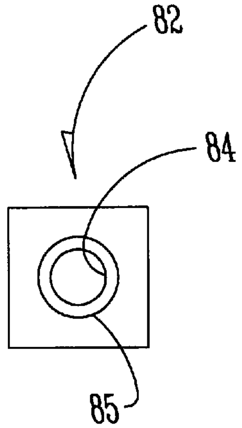
FIG. 11 is a bottom view of key of FIG. 10.

Referring to FIGS. 7–11, a locator key 82 has a hole 84 therethrough with a counterbore 85 formed around the hole 84. Referring again to FIG. 2, the key 82 detachably mounts to the locator block 26 at one of the four threaded holes 56, 58, 60, 62 in the keyways 48, 50. As best seen in FIGS. 7–8, the key 82 preferably has a rectangular horizontal cross-section and has an upper portion 86 and a lower portion 88. The upper portion 86 has a width $W_U$ that is adapted to precisely and slidingly fit (with light friction permissible) into the corresponding keyway 48 or 50. In FIG. 2, the key 82 is shown mounted in hole 60 by a threaded fastener 90, but other key mounting holes 56, 58 or 62 can be utilized as desired without detracting from the invention. Thus, the locator block 26 can be mounted in a T-slot 16 of the table 12 in a variety of different orientations. The lower portion 88 of the key 82 has a width $W_L$ that is adapted to precisely and slidably fit (with light friction) into one of the T-slot 16 on the table 12.

Referring to FIGS. 7–11, in conjunction with Table 1 below, a set, series or family of locator keys 82A–82F with widths $W_U$ and $W_L$ can be provided so as to allow the locator block 26 to be mounted to the table 12 with the appropriate sized T-nut 22 for the T-slot 16 that the table has.

TABLE 1

Width of Locator Key Portions and Corresponding T-Nut Sizes

| | $W_U$ | $W_L$ | T-Nut Size |
|---|---|---|---|
| 82A | .787 in. (20 mm) | .750 in. | ¾ in. |
| 82B | .787 | .6875 | 11/16 |
| 82C | .787 | .625 | ⅝ |
| 82D | .787 | .5625 | 9/16 |
| 82E | .787 | .6299 | 16 mm |
| 82F | .787 | .5512 | 14 mm |

When $W_U$ and $W_L$ are not equal, an undercut 92 between the two widths is preferred, as shown in FIGS. 7 and 8. Of course, the undercut 92 is unnecessary when $W_U$ and $W_L$ are equal (See FIG. 10 and 11). $W_U$ is preferably uniform and substantially fills the keyway in the locator block 26. Other sizes of keyways 48,50 and corresponding key widths $W_U$ can be utilized without detracting from the invention.

A clamp 94 mounts on the locator block 26 with a threaded rod 96. One end of the rod 96 installs into the hole 64. The other end of the rod 96 extends through a longitudinal slot 98 provided in the clamp 94 and engages a nut 100. A washer 102 is positioned between the nut 100 and the clamp 94. Conventionally, the washer 102 is integrally formed with the nut 100. Another threaded rod 104 has a lower end that installs into hole 66 and an upper end that abuts the bottom of the clamp 94 to act as a support for the clamp.

An optional stop plate 106 can be mounted to one of the sides 32, 34 of the locator block 26 adjacent the notch 76. The stop plate 106 has a plurality of holes 108, 110 that register with holes 68, 70 or 72, 74 respectively. Threaded fasteners 112 detachably mount the stop plate 106 to the block 26.

In use, the appropriate key 82 is selected and its upper portion 86 is mounted in one of the holes 56, 58, 60 or 62 using the fastener 90. The locator block 26 with the key 82 protruding therefrom is then placed on the surface 14 with the lower portion 88 of the key 82 slidably installed in the upper leg or throat 18 of one of the T-slots 16. The locator block 26 is then slid longitudinally in the T-slot 16 until the hole 40 registers with the threaded hole 24 in the T-nut 22. A threaded mounting bolt or screw 114 is then installed through the hole 40 and loosely tightened into the T-nut 22. In this condition, the block 26 can be slid longitudinally along the T-slot 16 to a precise desired location. Then, the bolt 114 is snugly tightened to fix the block 26 in place on the table 14.

A workpiece 116 is placed against the notch 76 of the locator block 26. In the case of a rectangular workpiece 116, as exemplified in FIG. 1, the bottom and one side of the workpiece 116 rest against the surfaces 78 and 80 respectively. An undercut 118 can be provided along the inside corner of the notch 76 to ensure proper abutment. The workpiece 116 is elevated an exact and known distance above the top surface 14 of the table 12. This pinpoints the location of the bottom surface of the workpiece and provides a known clearance for the machine's cutting tools when they pass through the workpiece. Furthermore, the exact position or location of one edge of the workpiece is also established with respect to one of the XYZ axes of the machine, depending on the location of the key 82. When the stop plate 106 is utilized and abutted by another edge of the workpiece 116, a complete XYZ reference system is provided. One skilled in the art will appreciate that this invention is adaptable to workpieces having non-rectangular shapes or more complex shapes. The invention eliminates the need for a separate base or fixture plate.

Thus, it can be seen that the present invention at least satisfies its stated objectives.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the scope of the invention as further defined in the following claims.

What is claimed is:

1. A workpiece holding device for mounting a workpiece on a machine table having a planar surface thereon with a T-slot having a first leg intersecting and perpendicular to the planar surface and a second leg connected to the first leg, the second leg being spaced from and extending parallel to the planar surface, a T-nut being slidably mounted in the T-slot, the device comprising:

- a locator block including a planar bottom surface adapted to directly slidingly and matingly engage the planar surface of the machine table and a mounting hole having a central axis that intersects the bottom surface to define a first point, the block including at least one workpiece locating surface disposed a predetermined distance from the first point;
- a key protruding from the bottom surface of the locator block at a second point offset horizontally a predetermined distance from the first point, the key having a width substantially the same as the first leg of the T-slot so as to slidably mount in the first leg;
- a fastener extending through the mounting hole at the first point for securing the locator block to the T-nut;
- a clamping mechanism secured to the locator block for clamping the workpiece to the locating surface of the locator block; and
- the predetermined distance between the first and second points being sufficient to insure that the key does not interfere with the T-nut when the locator block is secured to the T-nut.

2. The device of claim 1 wherein the at least one workpiece locating surface includes a first planar workpiece locating surface extending parallel to the bottom surface of the locator block at a predetermined distance above the bottom surface.

3. The device of claim 2 wherein the at least one workpiece locating surface includes a second planar workpiece locating surface that is adjacent to and perpendicular to the first planar workpiece locating surface so as to intersect the first planar workpiece locating surface and form an elongated L-shaped notch in the locator block for receiving an edge of the workpiece.

4. The device of claim 1 wherein the bottom surface of the locator block includes a keyway formed therein and the key is detachably mounted in the keyway.

5. The device of claim 4 wherein the keyway has a central longitudinal axis that extends through the first point.

6. A workpiece holding device for mounting a workpiece on a machine table having a planar surface thereon with a T-slot having a first leg intersecting and perpendicular to the planar surface and a second leg connected to the first leg, the second leg being spaced from and extending parallel to the planar surface, a T-nut being slidably mounted in the T-slot, the device comprising:

- a locator block including a planar bottom surface adapted to directly slidingly and matingly engage the planar surface of the machine table and a mounting hole having a central axis that intersects the bottom surface to define a first point, the block including at least one workpiece locating surface disposed a predetermined distance from the first point;
- a key protruding from the bottom surface of the locator block at a second point offset a predetermined distance from the first point, the key having a width substantially the same as the first leg of the T-slot so as to slidably mount in the first leg;
- a fastener extending through the mounting hole for securing the locator block to the T-nut;
- a clamping mechanism secured to the locator block for clamping the workpiece to the locating surface of the locator block; and
- the locator block having first and second keyways formed in the bottom surface thereof for slidably receiving the key, the keyways extending perpendicular to each other and intersecting at the first point.

7. The device of claim 6 wherein the first keyway has a longitudinal axis and a pair of mounting holes for the key offset in opposite directions along the longitudinal axis from the locator block mounting hole.

8. The device of claim 6 wherein the second keyway has a longitudinal axis and a pair of mounting holes for the key offset in opposite directions along the longitudinal axis from the locator block mounting hole.

9. A workpiece holding device for mounting a workpiece on a machine table having a planar surface thereon with a T-slot having a first leg intersecting and perpendicular to the planar surface and a second leg connected to the first leg, the second leg being spaced from and extending parallel to the planar surface, a T-nut being slidably mounted in the T-slot, the device comprising:

- a locator block including a planar bottom surface adapted to directly slidingly and matingly engage the planar surface of the machine table and a mounting hole having a central axis that intersects the bottom surface to define a first point, the block including at least one workpiece locating surface disposed a predetermined distance from the first point;
- a key protruding from the bottom surface of the locator block at a second point offset a predetermined distance from the first point, the key having a width substantially the same as the first leg of the T-slot so as to slidably mount in the first leg;

a fastener extending through the mounting hole for securing the locator block to the T-nut;

a clamping mechanism secured to the locator block for clamping the workpiece to the locating surface of the locator block;

the at least one workpiece locating surface including a first planar workpiece locating surface extending parallel to the bottom surface of the locator block at a predetermined distance above the bottom surface, and a second planar workpiece locating surface that is adjacent to and perpendicular to the first planar workpiece locating surface so as to intersect the first planar workpiece locating surface and form an elongated L-shaped notch in the locator block for receiving an edge of the workpiece; and a stop plate mounted to the locator block so as to protrude into the L-shaped notch and extend perpendicular the first and second workpiece locating surfaces.

10. The device of claim 9 wherein an undercut is formed in the locator block at the intersection of the first and second planar workpiece locating surfaces.

11. The device of claim 9 wherein the locator block is elongated and has opposite ends, the notch being formed in one of the ends of the block.

12. The device of claim 9 wherein the stop plate is detachably mounted to the locator block by a plurality of threaded fasteners.

13. The device of claim 4 wherein the keyway has a rectangular cross-section.

14. The device of claim 13 wherein the key has a rectangular cross-section.

15. The device of claim 13 wherein the key has a first portion having a first width that substantially fills the width of the keyway and a second portion that substantially fills the width of the first leg of the T-slot.

16. The device of claim 15 wherein first width of the key and the second width of the key are equal.

17. The device of claim 15 wherein an undercut is formed between the first width and the second width of the key.

18. The device of claim 15 wherein the key is selected from a set of keys, the keys having a uniform first width adapted to fill the keyway of the locator block and a plurality of different second widths corresponding to a plurality of different T-slot first leg widths.

* * * * *